United States Patent
Chappell et al.

(10) Patent No.: US 9,642,376 B1
(45) Date of Patent: May 9, 2017

(54) AUTOMATIC PRODUCT DIVERTER FOR MEAT PROCESSING PLANT

(71) Applicant: Hall Fabrication, Inc., Henderson, NV (US)

(72) Inventors: Dave Chappell, Las Vegas, NV (US); Scott Bruce, Knoxville, TN (US)

(73) Assignee: Hall Fabrication, Inc., Henderson, NV (US)

(*) Notice: Subject to any disclaimer, the term of this patent is extended or adjusted under 35 U.S.C. 154(b) by 0 days.

(21) Appl. No.: 15/173,818

(22) Filed: Jun. 6, 2016

(51) Int. Cl.
  *A22C 25/00* (2006.01)
  *A22C 17/00* (2006.01)
  *A22C 17/02* (2006.01)

(52) U.S. Cl.
  CPC ...... *A22C 17/0006* (2013.01); *A22C 17/0086* (2013.01); *A22C 17/0093* (2013.01); *A22C 17/02* (2013.01)

(58) Field of Classification Search
  CPC ......... A22C 25/14; B26D 7/0608; B26D 7/30
  USPC ................................ 452/135, 155, 177, 182
  See application file for complete search history.

(56) References Cited

U.S. PATENT DOCUMENTS

| 5,023,974 | A  | * | 6/1991  | Coles ............... A22B 7/001 198/377.1 |
| 5,295,898 | A  |   | 3/1994  | Andre et al. |
| 5,334,084 | A  | * | 8/1994  | O'Brien ............ A22B 5/0005 452/134 |
| 6,547,658 | B2 |   | 4/2003  | Boody et al. |
| 6,692,345 | B1 | * | 2/2004  | Kruger ............. A22B 5/0029 452/134 |
| 7,118,471 | B2 |   | 10/2006 | Chappell et al. |

FOREIGN PATENT DOCUMENTS

EP    1893031 B1    10/2012

OTHER PUBLICATIONS

Food and Agriculture Organization of the United Nations "Guidelines for slaughtering, meat cutting and further processing".

* cited by examiner

*Primary Examiner* — Richard Price, Jr.
(74) *Attorney, Agent, or Firm* — McKee, Voorhees & Sease, PLC

(57) ABSTRACT

An automated system and method is provided for separating left and right animal carcass cuts from one another. The system includes a conveyor to carry cut meat pieces along a path. A sensor generates a signal corresponding to the left or right cuts, and sends the signal to a processor or controller, which actuates a product diverter, which moves across the conveyor so as to push and remove selected meat pieces from the conveyor for further processing on a separate line. The diverters are pivotal out of the conveyor path if engaged by meat piece intended to continue along the conveyor path.

31 Claims, 4 Drawing Sheets

AUTOMATIC PRODUCT DIVERTER FOR MEAT PROCESSING PLANT

BACKGROUND OF THE INVENTION

In meat processing plants, the first cut of a carcass is a longitudinal center cut to divide the carcass into left and right halves or sides, which are generally mirror images of one another. The left and right sides continue down one conveyor line, but typically must be separated before proceeding to the next processing station, such as a loin puller, which includes knives for separating the loin from the belly portion of the carcass and from the chine or back bone side of the carcass. Typically, separation of the left and right sides is performed manually, which adds to labor costs, and is subject to human error. Since a loin puller is specific to each particular left or right side, improper separation leads to waste and lost profits. Thus, there is a need in the industry for an automated system for separating or diverting the left and right sides for further processing.

Accordingly, a primary objective of the present invention is the provision of an automated system to separate or divert left and right carcass sides, without the need for manual separation.

Another objective of the present invention is the provision of an automatic product diverter for a meat processing plant which eliminates or minimizes manual labor and human error.

A further objective of the present invention is the provision of an automated system for separating left and right carcass halves to different processing lines.

Still another objective of the present invention is the provision of a method for automatically separating left and right carcass sides in a meat processing facility.

Another objective of the present invention is a provision of a method for automatically diverting left and right meat cuts based on images of the cuts.

Yet another objective of the present invention is the provision of an automated system and method for sensing and distinguishing left and right carcass sides and then removing the left or right sides from a conveyor.

Another objection of the present invention is the provision of an automated system and method to remove mis-cut carcass pieces from a meat processing line.

A further objective of the present invention is the provision of a method and means for automatically separating left and right cuts of meat which are economical, accurate, and safe.

These and other objectives have become apparent from the following description of the invention.

SUMMARY OF THE INVENTION

An automated system and method is provided for separating left and right animal carcass cuts for further processing. The system includes a conveyor to receive the left and right product cuts. A camera is focused on the cuts so as to generate an image corresponding to each cut. A processor receives each image, and generates a single corresponding to either the left cut or the right cut. A mechanical diverter adjacent the conveyor receives the signals for only the left cuts or the right cuts, which is then actuated so as to push the left or right cuts from the conveyor. The diverter is actuated each time the left or right signal is generated, and then kicks the left or right cut off the conveyor. The system and method also detects mis-cut meat pieces and automatically removes such mis-cut pieces from the processing line.

DETAILED DESCRIPTION OF THE INVENTION

Figure 1:
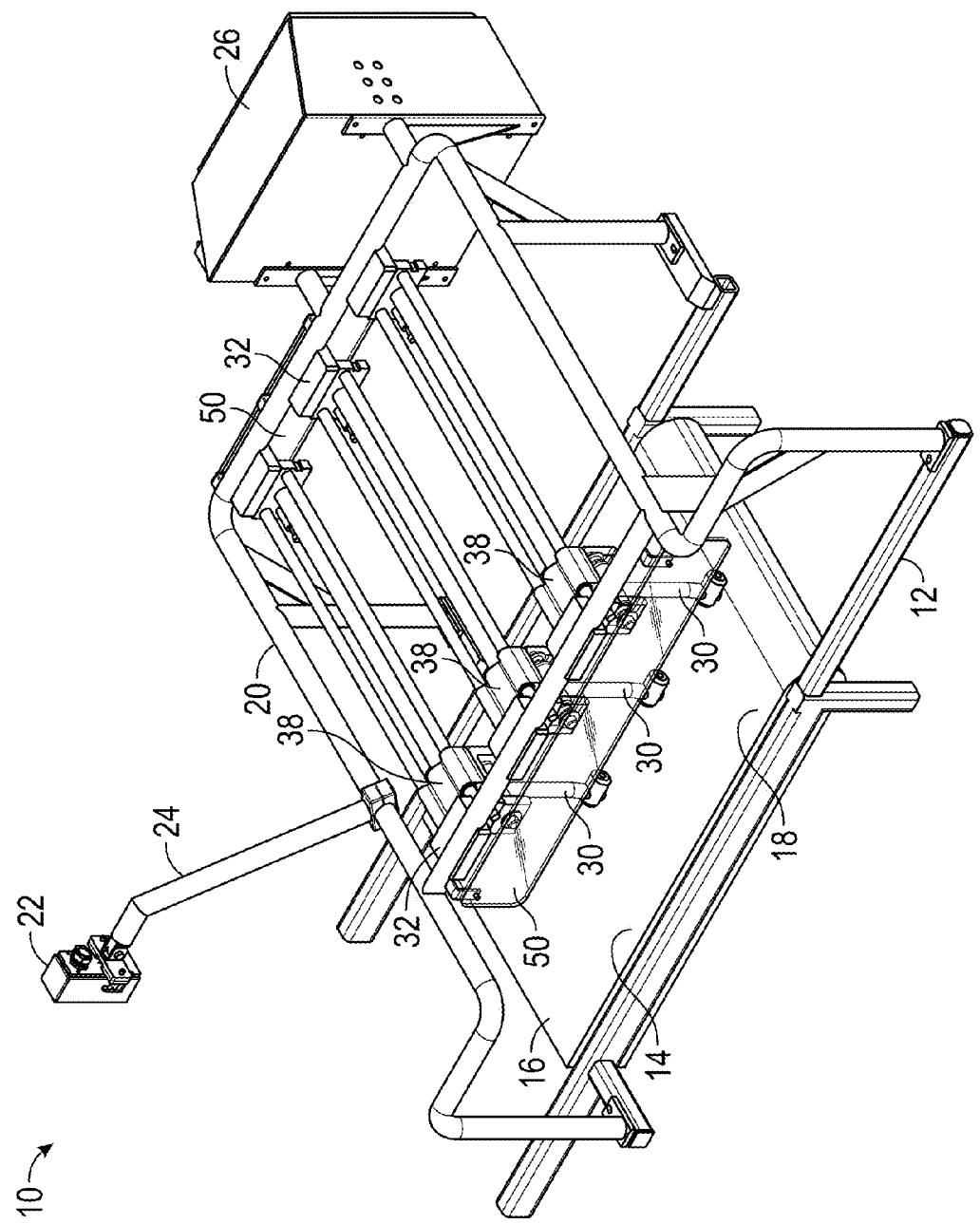
FIG. 1 is a perspective view of the automated system for separating left and right animal carcass cuts, according to the present invention.

The automated system for separating left and right halves of animal carcass cuts is generally designated in the drawings by the reference numeral 10. The system 10 includes a base 12 with a belt conveyor 14 operably mounted on the base 12. The conveyor 14 is adapted to receive the product cuts and carry them along a longitudinal path from the inlet end 16 to the outlet end 18 of the conveyor. It is understood that the length of the conveyor 14 can be extended beyond that shown in FIG. 1.

The system 10 also includes an upper frame 20 positioned over the base 12 and above the conveyor 14. The frame 20 supports a camera 22 on a mount arm 24 adjacent the inlet end 16 of the conveyor 14. The frame also supports a control box 26, which houses a computer, programmable logic controller, or microprocessor, 28, or the like.

The frame 20 also supports one or more mechanical diverters 30. In the preferred embodiment, there are three diverters 30 mounted on the frame 20, as seen in the drawings. The diverters 30 may take various forms. A preferred diverter is a linear thruster, such as a rodless cylinder, manufactured by Bimba Manufacturing of University Park, Ill. Each diverter/thruster includes a pair of support brackets 32 mounted at opposite ends to the frame 20. The diverter/thruster 30 also includes a pair of guide bars 34, and a central pneumatic line 36, each of which extend laterally above the conveyor 14 and transverse to the conveyor path. Each diverter 30 also has a carriage 38 slidably mounted on the guide bars 34 and operatively connected to the pneumatic line 36. A yoke 40 extends downwardly from the carriage 38, with an axle 42 extending through the opposite legs of the yoke 40. The axle 42 is oriented parallel to the conveyor path. A collar 44 is rotatably mounted on the axle 42, with a leg 46 fixed to the collar and extending downwardly. The leg 36 terminates in a foot 48. Thus, the carriage 38 carries the diverter leg 46 and foot 48 laterally across the conveyor 14, while the collar 44 allows the leg 46 and foot 48 to rotate about the axis of the axle 42 in a longitudinal direction. Shields or guards 50 extend along opposite sides of the frame 20 for safety.

Figure 2:
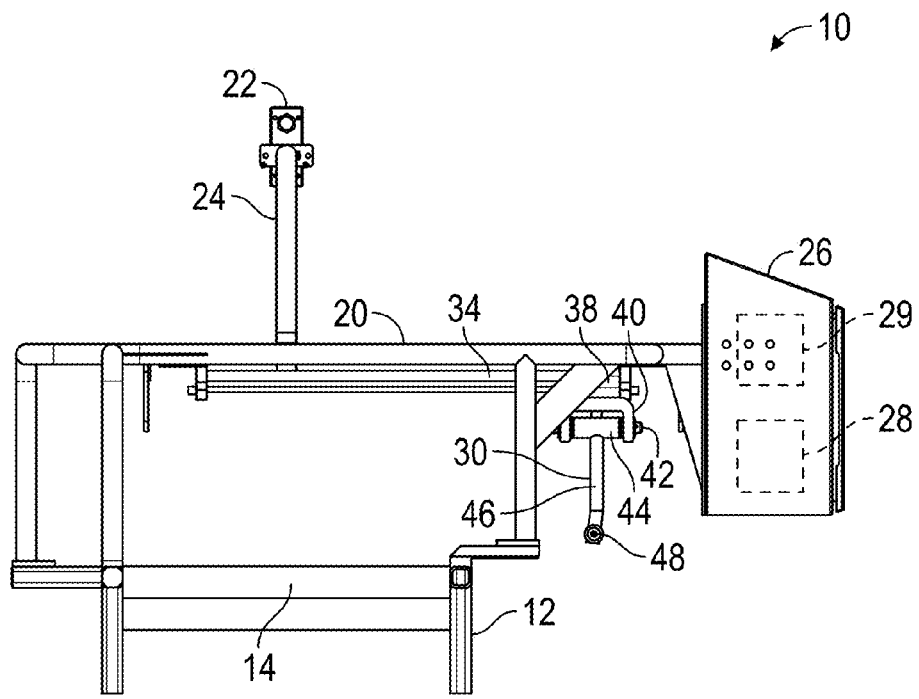
FIG. 2 is a front elevation view with the product diverter in a start or neutral position.
Figure 3:
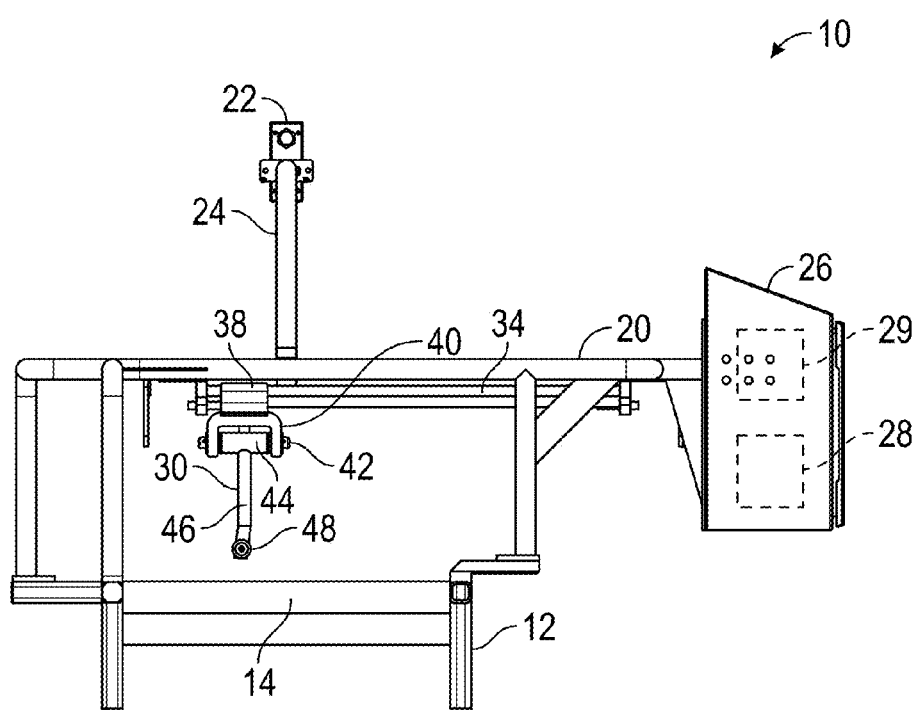
FIG. 3 is a front elevation view of the system with the product diverter in the actuated position.
Figure 4:
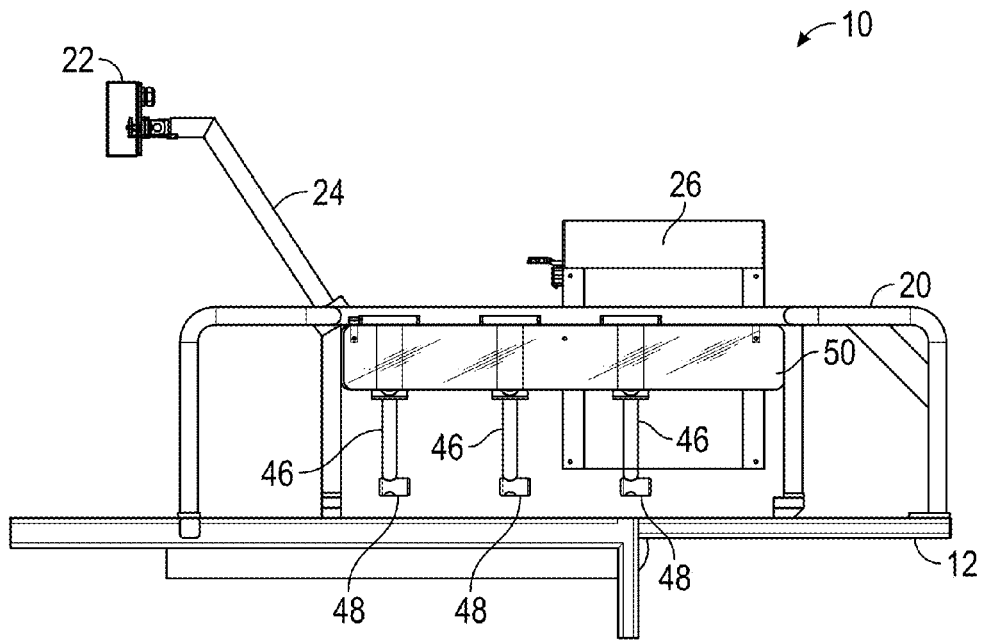
FIG. 4 is a side elevation view of the system with the product diverter in the actuated position.
Figure 5:
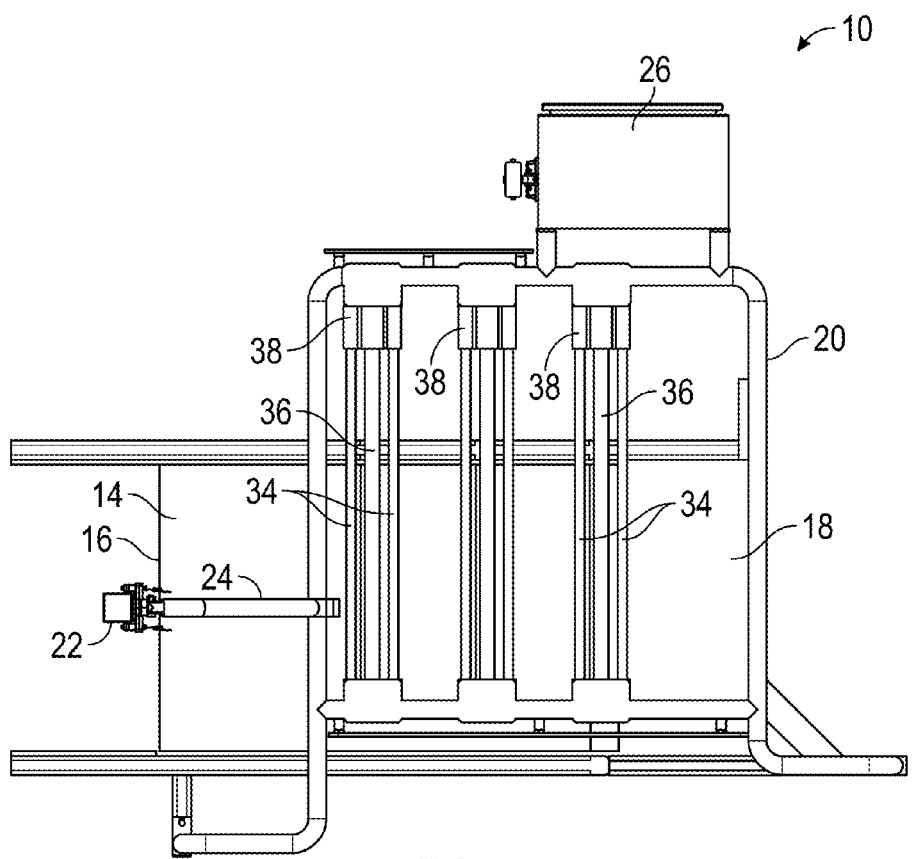
FIG. 5 is a top plan view of the system with the product diverter in the start/neutral position.
Figure 6:
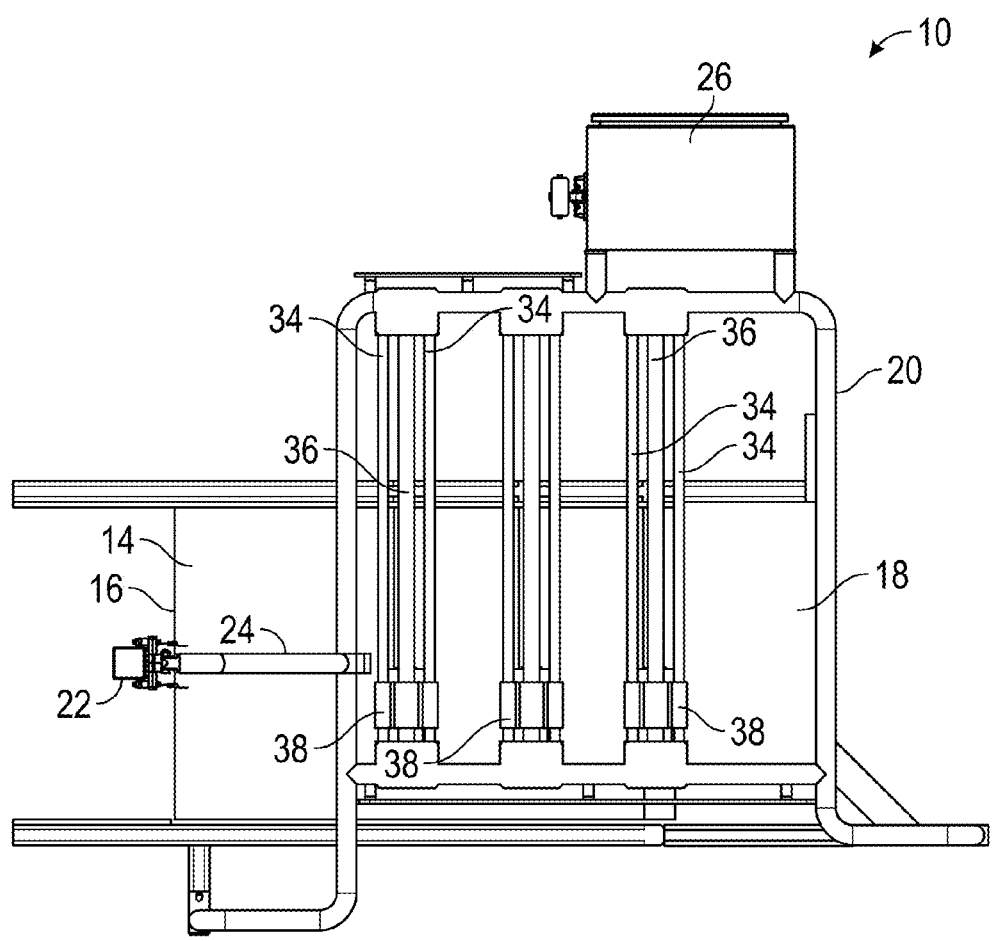
FIG. 6 is a top plan view of the system.

In operation, the meat carcass is cut along a center line to form left and right sides or halves 51, which are then placed on the inlet end 16 of the conveyor 14. As the conveyor 14 carries the cut halves along the longitudinal conveyor path, the camera 22 takes an image of each piece and sends the image to the controller processor 28. The processor generates a first signal corresponding to the left cut and a second signal corresponding to the right cut. A third signal may also be generated corresponding to mis-cuts that do not match a preferred left or right cut. The processor is programmed to send one of the left or right cut signals to the diverter controller, which then actuates the diverter 30. Actuation of the diverter 30 moves the carriage 38 with the attached leg 36 and foot 48 transversely across the conveyor 14 along the guide bars 34, from the start position on one side of the conveyor 14 to the actuated position towards the opposite side of the conveyor 14, as shown FIGS. 2 and 3, such that the foot pushes the corresponding left meat half or right meat half off the conveyor, while the remaining half cut continues to the outlet in 18 of the conveyor 14. The diverter 30 will also push mis-cut pieces from the conveyor 14 when the third signal is generated.

In the preferred embodiment with multiple diverters 30 the diverters are sequentially actuated so as to take turns pushing left or right halves from the conveyor 14. After the diverter 30 pushes a left or right side from the conveyor, the controller 28 returns the carriage 38, leg 46, and foot 48 to its initial position for future actuation. If another piece of meat engages the leg 46 or foot 48 during the return travel of the carriage 38, the leg 46 and foot 48 will pivot with the collar 44 on the axle 42 upperwardly so that the meat piece can pass through to the outlet end 18 of the conveyor 14.

If the meat processing plant accurately alternates the left and right meat cuts onto the conveyor 14, the camera 22 can be replaced with a photo electric eye which senses each piece as it passes through the line of sight of the photo electric eye, which in turns sends a signal to the processer 28 and/or controller. The controller 28 can then actuate the diverter(s) 30 for every other piece of meat product, which effectively pushes all the right cuts or all the left cuts from the conveyor 14, in a manner similar to that using the camera 22.

Thus, the automated system 10 of the present invention efficiently and accurately separates the left and right carcass sides from one another, without the use of manual labor. The conveyor 14 can run continuously, without stopping. The removed pieces of meat can be pushed onto a second conveyor (not shown) such that the left halves and right halves can be moved to the next processing station, such as a loin puller, which is left and right side specific.

The invention has been shown and described above with the preferred embodiments, and it is understood that many modifications, substitutions, and additions may be made which are within the intended spirit and scope of the invention. Form the foregoing, it can be seen that the present invention accomplishes at least all of its stated objectives.

What is claimed is:

1. An automated system for separating left and right animal carcass cuts, comprising:
   a conveyor to receive left and right cuts and carry the cuts along a longitudinal conveyor path;
   a camera focused on the cuts on the conveyor to generate an image for each cut;
   a diverter adjacent the conveyor to push only the right cuts or the left cuts laterally from the conveyor; and
   a processor to receive each image and generate a signal corresponding to either the left cuts or the right cuts, and to actuate the diverter each time one of the signals is generated.

2. The automated systems of claim 1 wherein the diverter is movable from a neutral position in the absence of the signals to an activated position after each signal is received.

3. The automated systems of claim 2 wherein the diverter is slidable between the neutral and activated position.

4. The automated systems of claim 1 wherein the diverter includes a slidable arm which pushes the right or left cuts from the conveyor.

5. The automated systems of claim 4 wherein the arm slides across the conveyor path.

6. The automated systems of claim 5 wherein the pivot axis is perpendicular to the conveyor path.

7. The automated systems of claim 4 wherein the arm has a pivot axis so as to pivot when engaged by one of the cuts not being pushed from the conveyor.

8. The automated systems of claim 1 wherein the processor also generates a mis-cut signal corresponding to mis-cut carcass pieces, and sends the miscut signal to the diverter to push the mis-cut pieces from the conveyor.

9. The automated systems of claim 1 wherein the conveyor runs continuously as the diverter pushes right or left cuts from the conveyor.

10. The automated systems of claim 1 wherein the diverter pushes the right or left cuts without manual intervention.

11. The automated system of claim 1 wherein the diverter extends over the conveyor.

12. The automated system of claim 1 wherein the diverter is moveable across the conveyor path.

13. The automated system of claim 1 wherein the diverter reciprocates across the conveyor.

14. A method of automatically separating left and right animal carcass cuts from one another, comprising:
    transporting a plurality of left and right carcass cuts along a conveyor path of a conveyor having opposite receiving and discharge ends;
    generating a first signal corresponding to the left cuts or to the right cuts, as the cuts move on the conveyor;
    actuating a product diverter each time one of the first signals is generated, whereby the diverter pushes either the left or right cuts from the conveyor before reaching the discharge end of the conveyor.

15. The method of claim 14 wherein the diverter moves across the conveyor when actuated.

16. The method of claim 14 wherein actuation of the diverter moves the diverter from a first position disengaged from the cuts on the conveyor to a second position engaging one of the cuts to be pushed from the conveyor.

17. The method of claim 16 wherein the diverter slides between the first and second positions.

18. The method of claim 17 wherein the diverter slides across the conveyor path.

19. The method of claim 14 further comprising pivoting the diverter out of engagement with one of the cuts not being pushed from the conveyor.

20. The method of claim 14 further comprising generating a second signal corresponding to mis-cut carcass pieces, and actuating the diverter each time one of the second signals is generated to push the mis-cut carcass pieces from the conveyor.

21. The method of claim 14 further comprising maintaining movement of the conveyor as the signals are generated and as the diverter pushes the left or right cuts from the conveyor.

22. The method of claim 14 further comprising pushing the left or right cuts from the conveyor without manual intervention.

23. The method of claim 14 wherein the conveyor moves continuously while left and right cuts are being separated from one another.

24. A method of sorting cuts of meat into first and second groups comprising:

conveying the cuts of meat along a conveyor in a single file line;
automatically determining which of the groups each cut of meat belongs to based on physical characteristics of the meat; and
automatically moving the cuts of meat in the first group to a second conveyor while the cuts of meat in the second group continue on the first conveyor such that the first and second groups of meat cuts progress along different paths.

25. The method of claim 24 the cuts of meat in the first group are moved by pushing.

26. The method of claim 24 wherein the determining step includes a visual inspection of the cuts of meat using a camera.

27. A conveyor assembly, comprising:
a belt conveyor to carry meat products;
a sensor to sense each meat product and generate a signal corresponding to a characteristic of each meat product;
a processor to receive the signals from the sensor and to assign each meat product to one of two groups; and
an actuator operatively connected to the processor to remove each meat product in only one of the groups laterally from the conveyor before reaching a downstream end of the conveyor.

28. The conveyor assembly of claim 27 wherein the actuator pushes the meat products in the one group from the conveyor.

29. The conveyor assembly of claim 27 wherein the sensor includes a camera to view each meat product on the conveyor.

30. The conveyor assembly of claim 27 wherein the actuator is positioned above the belt conveyor.

31. The conveyor assembly of claim 27 wherein the actuator moves back and forth over the belt conveyor.

* * * * *